(12) United States Patent
Neppalli et al.

(10) Patent No.: US 9,424,864 B2
(45) Date of Patent: Aug. 23, 2016

(54) DATA MANAGEMENT FOR A DATA STORAGE DEVICE WITH ZONE RELOCATION

(71) Applicant: Western Digital Technologies, Inc., Irvine, CA (US)

(72) Inventors: Srinivas Neppalli, Irvine, CA (US); Edwin Scott Olds, Fort Collins, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 163 days.

(21) Appl. No.: 14/322,064

(22) Filed: Jul. 2, 2014

(65) Prior Publication Data

US 2016/0005423 A1    Jan. 7, 2016

(51) Int. Cl.
   *G06F 12/00*    (2006.01)
   *G11B 5/09*    (2006.01)
   *G06F 3/06*    (2006.01)
   *G06F 13/00*    (2006.01)
   *G06F 13/28*    (2006.01)

(52) U.S. Cl.
   CPC ............... *G11B 5/09* (2013.01); *G06F 3/0616* (2013.01); *G06F 3/0638* (2013.01); *G06F 3/0674* (2013.01)

(58) Field of Classification Search
   CPC .... G06F 3/0616; G06F 3/0674; G06F 3/0638
   See application file for complete search history.

(56) References Cited

U.S. PATENT DOCUMENTS

| | | | |
|---|---|---|---|
| 5,333,311 A * | 7/1994 | Whipple, II | G06F 3/0601 |
| 5,619,690 A * | 4/1997 | Matsumani | G06F 3/0601 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,088,766 A * | 7/2000 | Bachmat | G06F 3/061 |
| | | | 711/114 |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |

(Continued)

*Primary Examiner* — Mark Giardino, Jr.

(57) ABSTRACT

Managing data stored on media of a Data Storage Device (DSD) using zone relocation. At least a portion of the media is logically divided into a plurality of zones and zones are identified with access counts greater than or equal to a threshold. The access count for each of the identified zones indicates a number of times data in the zone has been read or written. Data is relocated from at least one zone of the identified zones to at least one destination zone on the media to reduce a data access time between the identified zones.

24 Claims, 8 Drawing Sheets

(56) References Cited

U.S. PATENT DOCUMENTS

| | | |
|---|---|---|
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |

(56) References Cited

U.S. PATENT DOCUMENTS

| | | |
|---|---|---|
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,112,603 B2 * | 2/2012 | Dow ............ G06F 3/0613 711/112 |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |

(56) References Cited

U.S. PATENT DOCUMENTS

| | | |
|---|---|---|
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton et al. |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0272038 A1* | 10/2012 | Wei ............... G06F 3/0613 711/206 |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

| Block | LBAs x 10⁶ | Access Count |
|---|---|---|
| A | 0 – 399 | 784 |
| B | 400 – 799 | 189 |
| C | 800 – 1,119 | 42 |
| D | 1,200 – 1,599 | 627 |

| Sub-Block | LBAs x 10⁶ | Access Count |
|---|---|---|
| A1 | 0 – 99 | 64 |
| A2 | 100 – 199 | 352 |
| A3 | 200 – 299 | 101 |
| A4 | 300 – 399 | 267 |
| D1 | 1,200 – 1,299 | 28 |
| D2 | 1,300 – 1,399 | 431 |
| D3 | 1,400 – 1,499 | 105 |
| D4 | 1,500 – 1,599 | 63 |

| Zone | LBAs x 10$^6$ | Access Count | |
|---|---|---|---|
| A2 – 1 | 100 – 124 | 249 | ← |
| A2 – 2 | 125 – 149 | 45 | |
| A2 – 3 | 150 – 174 | 42 | |
| A2 – 4 | 175 – 199 | 16 | |
| A4 – 1 | 300 – 324 | 58 | |
| A4 – 2 | 325 – 349 | 121 | ← |
| A4 – 3 | 350 – 374 | 74 | |
| A4 – 4 | 375 – 399 | 14 | |
| D2 – 1 | 1,300 – 1,324 | 174 | ← |
| D2 – 2 | 1,325 – 1,349 | 36 | |
| D2 – 3 | 1,350 – 1,374 | 0 | |
| D2 – 4 | 1,375 – 1,399 | 221 | ← |

FIG. 6C

| Zone | LBAs x $10^6$ | PBAs x $10^6$ |
|---|---|---|
| A2 – 1 | 100 – 124 | 100 – 124 |
| A4 – 2 | 325 – 349 | 328 – 352 |
| D2 – 1 | 1,300 – 1,324 | 1,304 – 1,329 |
| D4 – 4 | 1,375 – 1,399 | 1,380 – 1,405 |

FIG. 7A

| Zone | LBAs x $10^6$ | PBAs x $10^6$ |
|---|---|---|
| A2 – 1 | 100 – 124 | 405 – 429 |
| A4 – 2 | 325 – 349 | 328 – 352 |
| D2 – 1 | 1,300 – 1,324 | 353 – 377 |
| D4 – 4 | 1,375 – 1,399 | 430 – 454 |

FIG. 7B

DATA MANAGEMENT FOR A DATA STORAGE DEVICE WITH ZONE RELOCATION

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk.

To access data from a surface of the disk, the head seeks to the location of the data on the disk during a seek operation. A long seek operation can result in a decreased performance of the DSD due to a longer time to access the data from the disk.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 6C depicts the identification of zones with access counts greater than or equal to a threshold according to an embodiment.

FIG. 7A depicts an initial logical to physical mapping for the identified zones of FIG. 6C according to an embodiment.

FIG. 7B illustrates a logical to physical mapping for the identified zones of FIG. 6C after updating the mapping to account for the relocation of data according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
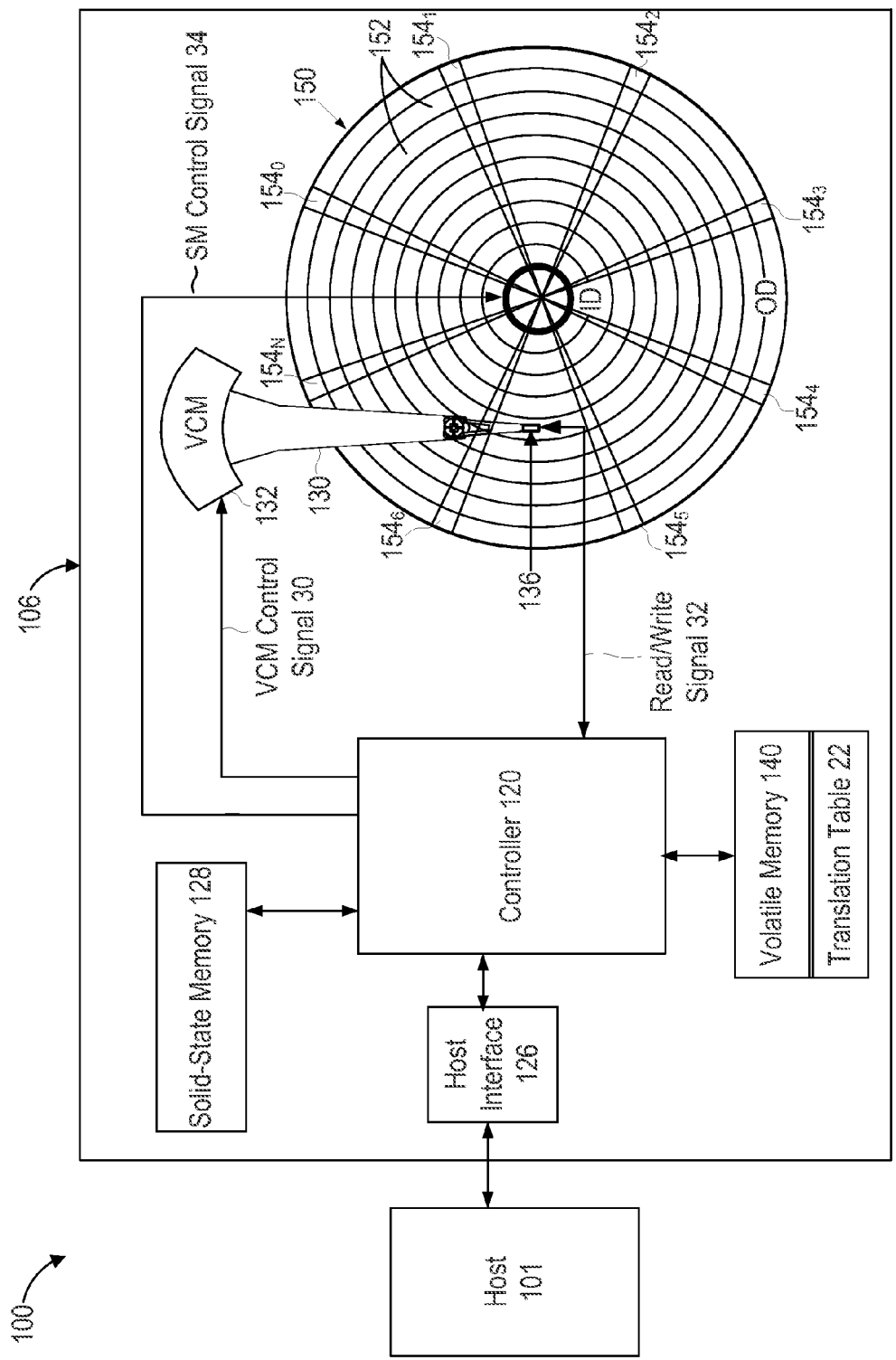
FIG. 1 is a block diagram depicting a Data Storage Device (DSD) according to an embodiment.

FIG. 1 shows system 100 according to an embodiment which includes host 101 and Data Storage Device (DSD) 106. System 100 can be, for example, a computer system (e.g., server, desktop, mobile/laptop, tablet, smartphone, etc.) or other electronic device such as a digital video recorder (DVR). In this regard, system 100 may be a stand-alone system or part of a network. Those of ordinary skill in the art will appreciate that system 100 and DSD 106 can include more or less than those elements shown in FIG. 1 and that the disclosed processes can be implemented in other environments.

In the example embodiment of FIG. 1, DSD 106 includes both solid-state memory 128 and disk 150 for storing data. In this regard, DSD 106 can be considered a Solid-state Hybrid Drive (SSHD) in that it includes both solid-state Non-Volatile Memory (NVM) media and disk NVM media. In other embodiments, each of disk 150 or solid-state memory 128 may be replaced by multiple Hard Disk Drives (HDDs) or multiple Solid-State Drives (SSDs), respectively, so that DSD 106 includes pools of HDDs or SSDs. In yet other embodiments, the NVM media of DSD 106 may only include disk 150 without solid-state memory 128.

DSD 106 includes controller 120 which includes circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 126 can be included as part of controller 120.

In the example of FIG. 1, disk 150 is rotated by a spindle motor (not shown). DSD 106 also includes head 136 connected to the distal end of actuator 130 which is rotated by Voice Coil Motor (VCM) 132 to position head 136 in relation to disk 150. Controller 120 can control the position of head 136 and the rotation of disk 150 using VCM control signal 30 and SM control signal 34, respectively.

As appreciated by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks (not shown) for storing data on a surface of disk 150 from an Inside Diameter (ID) portion to an Outside Diameter (OD) portion of disk 150. In the example of FIG. 1, the tracks on disk 150 are grouped together into zones 152 with each track divided into a number of sectors that are spaced circumferentially along the tracks. In other embodiments, zones 152 may include groups of sectors within a track rather than groups of tracks.

Disk 150 also includes a plurality of angularly spaced servo wedges $154_0$-$154_N$, each of which may include embedded servo information that can be read by head 136 to determine a position of head 136 over disk 150. For example, each servo wedge $154_0$-$154_N$ may include a pattern of alternating magnetic transitions (servo burst), which may be read by head 136 and used to estimate the position of head 136 relative to disk 200.

In addition to disk 150, the NVM media of DSD 106 also includes solid-state memory 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

Volatile memory 140 can include, for example, a Dynamic Random Access Memory (DRAM) which can be used by DSD 106 to temporarily store data. Data stored in volatile memory 140 can include data read from NVM media (e.g., disk 150 or solid-state memory 128), data to be written to NVM media, instructions loaded from firmware of DSD 106 for execution by controller 120, or data used in executing firmware of DSD 106.

As shown in the embodiment of FIG. 1, volatile memory 140 stores translation table 22, which provides a mapping between Logical Block Addresses (LBAs) used by host 101 to address data and physical locations (e.g., Physical Block Addresses (PBAs)) indicating physical locations on disk 150 or in solid-state memory 128. In one implementation, a backup copy of a translation table is stored on disk 150 which is updated to account for changes to translation table 22 stored in volatile memory 140. In other embodiments, translation table 22 may be stored in a different location such as in solid-state memory 128. Translation table 22 is described in more detail below with reference to FIGS. 7A and 7B.

In operation, host interface 126 receives read and write commands from host 101 via host interface 126 for reading data from and writing data to the NVM media of DSD 106. In response to a write command from host 101, controller 120 may buffer the data to be written for the write command in volatile memory 140.

For data to be stored in solid-state memory 128, controller 120 receives data from host interface 126 and may buffer the data in volatile memory 140. In one implementation, the data is then encoded into charge values for charging cells (not shown) of solid-state memory 128 to store the data.

In response to a read command for data stored in solid-state memory 128, controller 120 in one implementation reads current values for cells in solid-state memory 128 and decodes the current values into data that can be transferred to host 101. Such data may be buffered by controller 120 before transferring the data to host 101 via host interface 126.

For data to be written to disk 150, controller 120 can encode the buffered data into write signal 32 which is provided to head 136 for magnetically writing data to the surface of disk 150.

In response to a read command for data stored on disk 150, controller 120 positions head 136 via VCM control signal 30 to magnetically read the data stored on the surface of disk 150. Head 136 sends the read data as read signal 32 to controller 120 for decoding, and the data is buffered in volatile memory 140 for transferring to host 101.

As discussed in more detail below, particular zones 152 may be accessed for reading or writing more frequently than other zones 152 on disk 150. Often a workload from host 101 includes localized random activity spread across a stroke of actuator 130. This can reduce performance of DSD 106 in servicing read and write commands since it can take a relatively long time (e.g., 5 ms or longer) to position head 136 from one localized area of activity to another area of localized activity.

Figure 2:
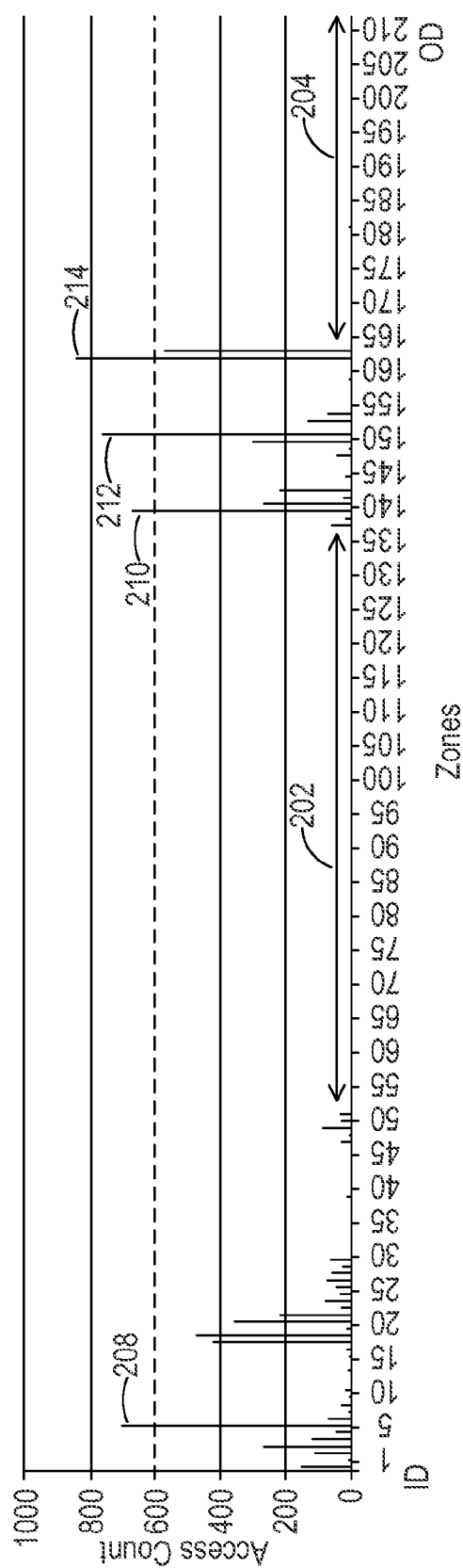
FIG. 2 illustrates an example histogram of access counts for a plurality of zones according to an embodiment.

FIG. 2 illustrates an example of such localized activity across disk 150 according to an embodiment. Zones 152 on disk 150 are shown along the x-axis corresponding to their physical locations from an ID portion to an OD portion of disk 150. An access count indicating a number of times a particular zone has been accessed for reading or writing is shown in FIG. 2. Certain zones such as zones 208, 210, 212 and 214 have a relatively high frequency of access as compared to other zones. The zones with a high frequency of access can be separated by large distances across disk 150 such as areas 202 and 204 with little or no access activity. Performance of DSD 106 generally suffers by having zones with high access counts spread out across disk 150 since this can result in longer seek times when moving head 136 from one frequently accessed zone to the next.

The processes discussed below involve identifying zones with an access count greater than or equal to a threshold and relocating data from at least one of the identified zones to reduce a data access time between the identified zones. The data access time between identified zones can refer to the time it takes to read or write data in an identified zone after reading or writing data in another identified zone.

In some cases, relocating data from at least one identified zone can include moving frequently accessed zones so that they are in close physical proximity to each other on a surface of a disk either radially by relocating the data to adjacent tracks or circumferentially by relocating the data to adjacent sectors or groups of sectors within a track. In other cases, data from at least one identified high access zone can be relocated to a different disk or a different disk surface in a disk pack so that the zones are in closer radial proximity to each other in the disk pack. In such an example, DSD 106 can then quickly switch from one head to another head in a head stack assembly to change between accessing high frequency zones on different disk surfaces with little or no movement of actuator 130.

In some embodiments, the access count may be a random access count indicating a number of times data in a particular zone has been non-sequentially read or written. In contrast to sequential reads and writes, non-sequential or random reads and writes are typically isolated accesses of data from locations that are spread across the media. Sequential writes on the other hand include accesses of data from adjacent or nearly adjacent locations on the media. As a result, non-sequential reads and writes are generally more time consuming than sequential reads and writes since head 136 typically needs to reposition farther to complete a series of non-sequential reads or writes.

In other embodiments, the access count may indicate a number of times data in a particular zone has been sequentially read or written. Although the performance of a series of non-sequential reads or writes can be more time consuming, relocating zones that are frequently sequentially accessed can also improve a performance of DSD 106 in servicing read and write commands. In some embodiments, the access count can include both sequential and non-sequential reads and writes.

In FIG. 2, a threshold number of access counts has been set at 600 access counts as indicated by the dashed line. Zones 208, 210, 212, and 214 may be identified as candidate zones for relocation with access counts greater than or equal to the threshold. In some embodiments, the threshold may be adjusted based on a data access time between zones with high access counts relative to other zones. For example, the threshold for zone 208 may be lowered to 400 based on the greater data access time or distance between zone 208 and the other frequently accessed zones when compared to shorter data access times or distances between zones 210, 212, and 214.

Figure 3:
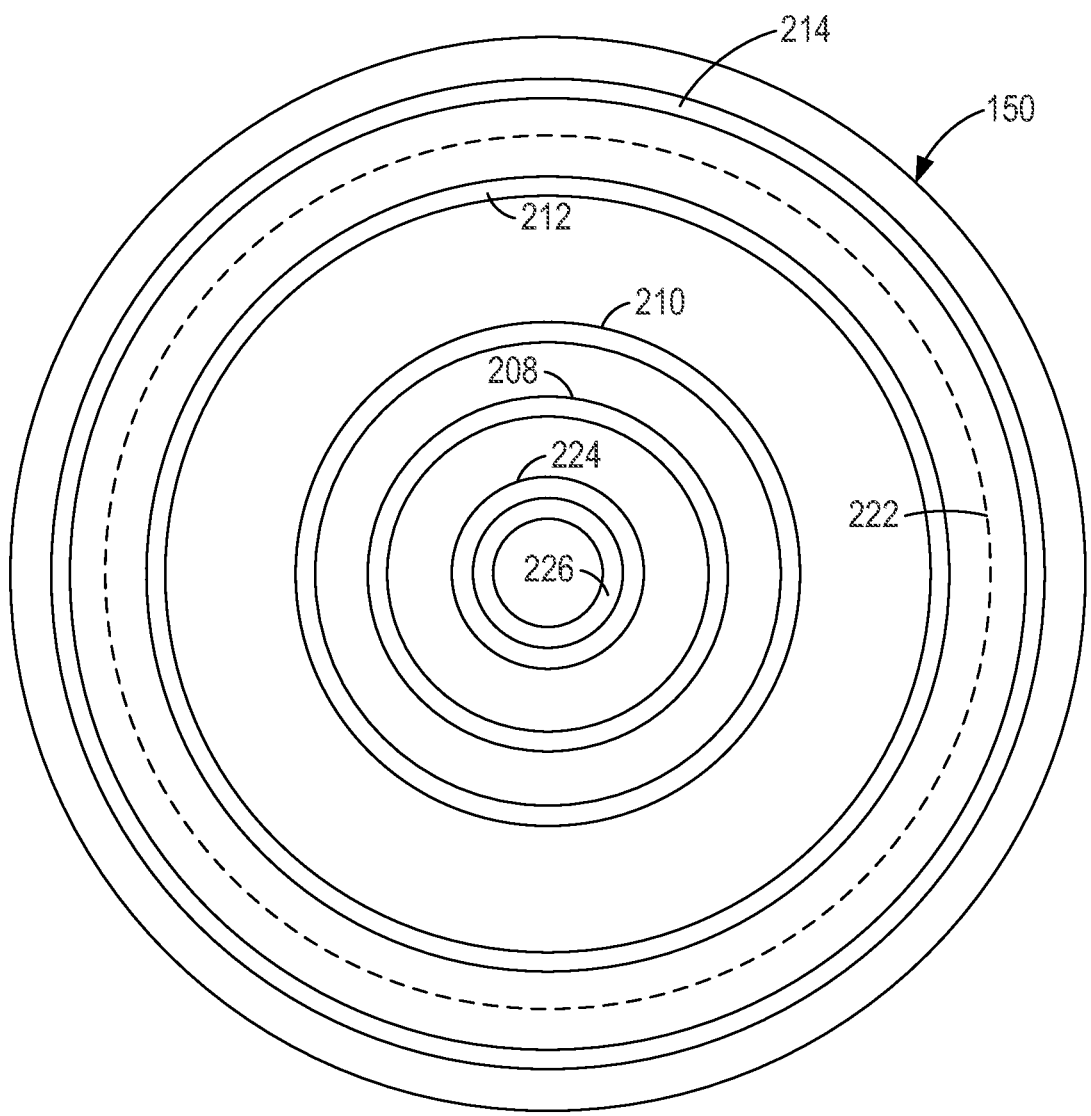
FIG. 3 depicts initial zone locations on a disk media according to an embodiment.

FIG. 3 depicts initial locations for zones 208, 210, 212 and 214 on disk 150 according to an embodiment. As shown in FIG. 3, zones 208, 210, 212 and 214 are initially spread out across disk 150.

In addition, FIG. 3 depicts first staging area 224 and second staging area 226 for copying or relocating data from an identified zone to a destination zone. The location of staging areas 224 and 226 may differ in other embodiments and do not need to be located adjacent to each other. In this regard, one or both of staging areas 224 and 226 in other embodiments may be located on a different disk or different media such as solid-state memory 128 or volatile memory 140.

The area of disk 150 outside of dashed line 222 indicates an OD portion of disk 150 that is associated with a quicker data access rate than other portions of disk 150. In some implementations, destination zones for relocating frequently accessed data may be located at or beyond dashed line 222 to allow for quicker access of frequently accessed data.

Although zones 208, 210, 212 and 214 in FIG. 3 each include groups of tracks, the identified zones in other embodiments may only include a single track or a portion of a single track. In cases where identified zones include portions of a single track, data from the identified zones may be located adjacent to each other circumferentially by relocating data from the identified zones in close physical proximity to each other in the same track or in a radially adjacent track.

Figure 4:
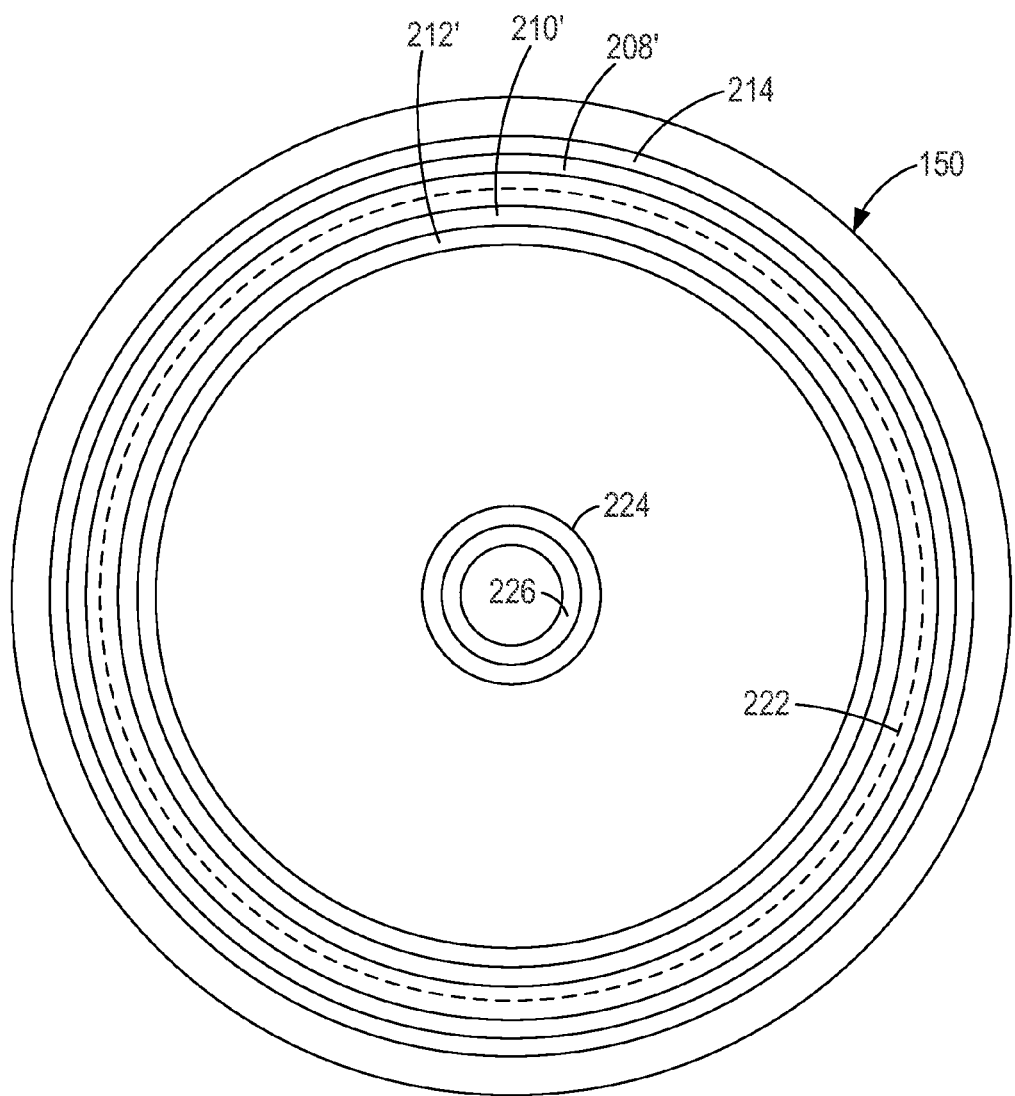
FIG. 4 depicts the zones of FIG. 3 after relocation according to an embodiment.

FIG. 4 depicts the relocation of data from the zones of FIG. 3 according to an embodiment. As shown in FIG. 4, data from each of zones 208, 210, and 212 has been relocated to destination zones 208', 210', and 212', respectively. Zone 214 remains in its initial location. In other examples, data from a different number of identified zones may be relocated such that, for example, data from all of the identified zones (i.e., zones 208, 210, 212, 214) are relocated to destination zones or data from only half of the identified zones are relocated to destination zones.

In the example of FIG. 4, the data of zones 208, 210, 212 has been relocated to destination zones 208', 210', and 212' using staging areas 224 and 226 to swap the data initially stored in a destination zone with the data initially stored in an identified zone. More specifically, data initially stored in a destination zone is copied to one of staging areas 224 or 226 to make room for data from an identified zone. The data initially stored in the identified zone is copied to the other staging area. The data initially stored in the destination zone can then be copied from its staging area to the initial location of the identified zone and the data initially stored in the identified zone can be copied from its staging area to the destination zone.

In other embodiments, the staging areas may not be located on disk 150 and may be located on a different disk in a disk pack or may be located in a different memory media such as solid-state memory 128 or volatile memory 140.

Figure 5:
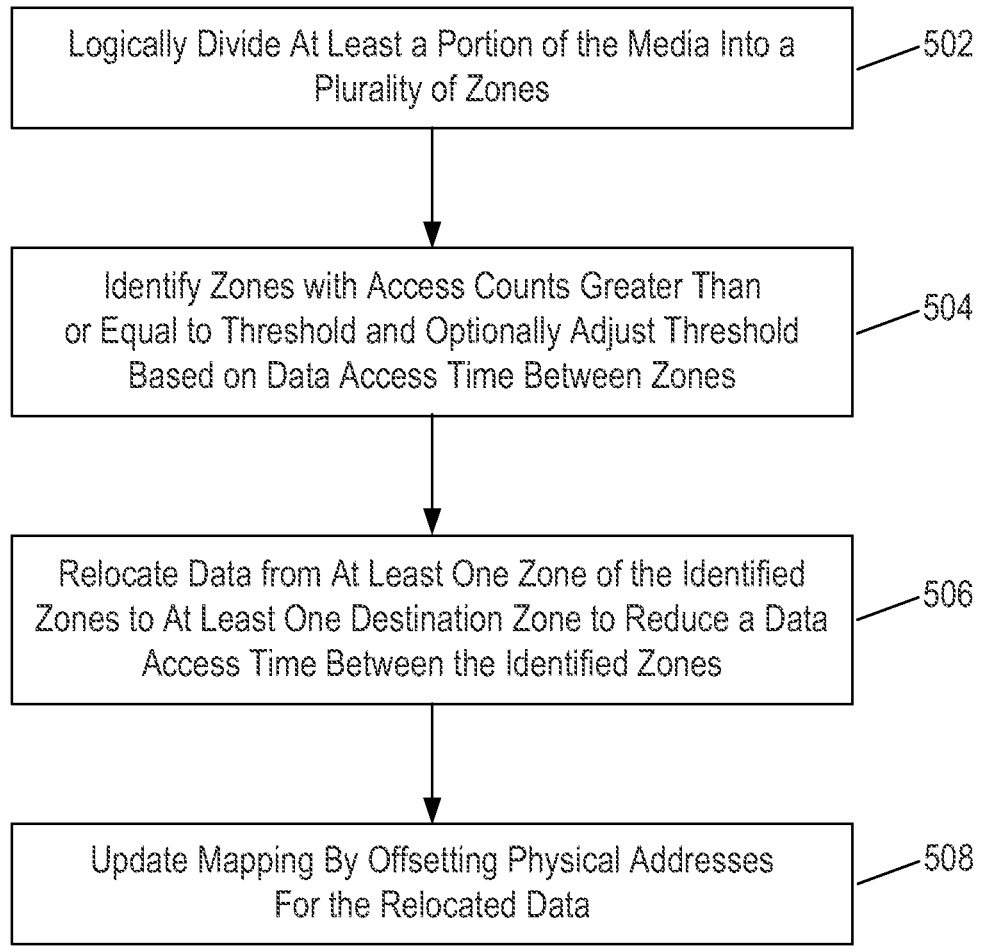
FIG. 5 is a flowchart for a zone relocation process according to an embodiment.

FIG. 5 is a flowchart for a zone relocation process that can be performed by controller 120 executing a firmware of DSD 106 or other computer-executable instructions according to an embodiment. In block 502, controller 120 logically divides at least a portion of a media such as disk 150 into a plurality of zones. The logical division of the media can be made by dividing LBAs into ranges or blocks of LBAs. As part of the division in block 502, controller 120 may first logically divide the media into a plurality of blocks with each block having a larger data capacity than the individual zones. Such large scale division followed by a finer subdivision of the blocks into zones can ordinarily allow for a more efficient use of resources (e.g., controller 120 and volatile memory 140) by not having to evaluate access counts for each zone individually. Instead, the process of FIG. 5 may only evaluate the access counts for zones in blocks with higher access counts. An example of such a logical division into blocks, sub-blocks, and zones is conceptually illustrated in FIGS. 6A to 6C.

Figure 6A:
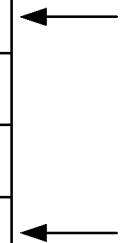
FIG. 6A depicts blocks of zones with their respective access counts according to an embodiment.

FIG. 6A depicts blocks of zones with their respective access counts according to an embodiment. As shown in FIG. 6A, the media has been logically divided in terms of LBAs into four blocks A, B, C, and D. The blocks of FIG. 6A may represent a logical space for all of the media or for only a portion of the media. In addition, other embodiments may divide the media into a different number of blocks.

In the example of FIG. 6A, blocks A and D are identified as having a high access count relative to other blocks. This may be accomplished by comparing the access counts for each of the blocks or by determining whether the access counts for the blocks have reached or exceeded a threshold number of access counts.

Figure 6B:
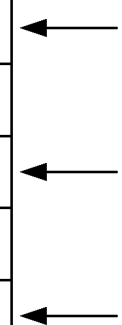
FIG. 6B depicts a subdivision of the blocks of zones of FIG. 6A according to an embodiment.

FIG. 6B depicts a subdivision of the identified blocks of FIG. 6A according to an embodiment. As shown in FIG. 6B, each of blocks A and D are further divided into sub-blocks A1 to A4 and D1 to D4, respectively. Sub-blocks A2, A4, and D2 are identified as having a high access count relative to the other sub-blocks. As with the identification of blocks in FIG. 6A, the identification of sub-blocks with a high access count may be accomplished by comparing the access counts for each of the sub-blocks or by determining whether the access counts for the sub-blocks have reached or exceeded a threshold number of access counts.

FIG. 6C depicts the identification of zones with access counts greater than or equal to a threshold according to an embodiment. As shown in FIG. 6C, each of the identified sub-blocks of A2, A4, and D2 in FIG. 6B have been further subdivided into four zones. In addition, zones A2-1, A4-2, D2-1, and D2-4 have been identified as zones with access counts greater than or equal to a threshold number of access counts. As described in more detail below, these identified zones serve as candidates for relocating data from the zones to destination zones.

In other embodiments, the number and size of blocks, sub-blocks and zones can differ from the example provided above with FIGS. 6A to 6C based on available resources such as a processing speed of controller 120 or an available data capacity of volatile memory 140. Similarly, the number of iterations of subdividing can also differ so as to include more or less iterations of divisions. For example, other embodiments may only include a division of the media into blocks and zones without subdividing the blocks into sub-blocks. Other embodiments may include the subdivision of sub-blocks into smaller sub-blocks before subdividing the smaller sub-blocks into zones.

Returning to the relocation process of FIG. 5, controller 120 in block 504 identifies zones with access counts greater than or equal to a threshold. This may be performed along the lines as discussed for the example of FIG. 6C discussed above. Controller 120 may also optionally adjust the threshold based on a data access time between zones with high access counts relative to other zones. This adjustment can compensate for factors such as the distance between frequently accessed zones being greater so as to allow such zones to reach the adjusted threshold quicker than if such zones were in closer physical proximity to each other.

In block 506, data is relocated from at least one zone of the identified zones to at least one destination zone to reduce a data access time between the identified zones. As discussed above, this may include relocating data from an identified zone to a destination zone such that the data from the identified zones is in closer radial or circumferential proximity on a disk surface. The relocation of data in block 506 may also include relocating data from the identified zones so that the data is in closer radial proximity on different disk surfaces in a disk pack to reduce movement of actuator 130 when accessing data from the identified zones.

In block 508, controller 120 updates a mapping by offsetting physical addresses for the relocated data. The mapping can include, for example, a portion of translation table 22 where the mapping indicates physical locations in terms of PBAs for data stored on the media. FIGS. 7A and 7B depict example portions of translation table 22 to illustrate one implementation for updating the mapping in block 508 of FIG. 5.

FIG. 7A depicts an initial logical to physical mapping for the identified zones of FIG. 6C (i.e., zones A2-1, A4-2, D2-1, and D4-4) according to an embodiment. As shown in FIG. 7A, the LBAs for each of the identified zones are mapped to PBAs indicating a physical location on the media where data for the LBAs are stored. In the example of FIG. 7A, there is not an exact one-to-one correspondence between LBAs and PBAs as shown by the slightly higher physical addressing for zones A4-2, D2-1, and D4-4 as compared to the logical addressing for these zones. This difference can represent defects in the media such as defective sectors on disk 150 that have been mapped out or other reserved sectors that are not available for storing user data. Although the numerical ranges for LBAs in FIG. 7A generally correspond to approximately the same numerical ranges for PBAs for each zone, other embodiments may have PBA ranges that do not necessarily correspond to the ranges of LBAs.

FIG. 7B illustrates a logical to physical mapping for identified zones A2-1, A4-2, D2-1, and D4-4 after the mapping has been updated to account for the relocation of data according to an embodiment. When compared to FIG. 7A, the LBAs for the identified zones remains the same while the PBAs for some of the identified zones has been offset to account for the relocation of data from the zones. In particular, the PBAs for zones A2-1, D2-1, and D4-4 have been offset indicating that the data for these zones has been relocated.

After updating the mapping in block 508, the process of FIG. 5 ends. Controller 120 may repeat the process of FIG. 5 or portions of the process of FIG. 5 after a predetermined amount of time and/or after a predetermined a number of reads or writes on the media. In one embodiment, controller 120 may periodically check to determine if any zones should be relocated by performing block 504. If it is determined that a data access time can be reduced by relocating data from at least one identified zone, controller may proceed with performing blocks 506 and 508 to relocate the data. By periodically identifying zones with access counts greater than or equal to a threshold and relocating data, it is ordinarily possible to adapt to changing data access patterns and reduce an average or overall data access time for DSD 106.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   at least one media for storing data; and
   a controller configured to:
      logically divide at least a portion of the at least one media into a plurality of zones by dividing logical block addresses for the at least one media into ranges of logical block addresses;
      identify zones of the plurality of zones with access counts greater than or equal to a threshold, wherein the access count for each of the identified zones indicates a number of times data in the zone has been read or written; and
      relocate data from at least one of the identified zones to at least one destination zone on the at least one media so that the relocated data is in closer physical proximity to other data from at least one other identified zone.

2. The DSD of claim 1, wherein the access count is a random access count indicating a number of times data in the zone has been non-sequentially read or written.

3. The DSD of claim 1, wherein the access count is a sequential access count indicating a number of times data in the zone has been sequentially read or written.

4. The DSD of claim 1, wherein the controller is further configured to update a mapping indicating physical locations for data stored on the at least one media by offsetting physical addresses in the mapping for the relocated data.

5. The DSD of claim 1, wherein the controller is further configured to:
logically divide the at least one media into a plurality of blocks with each block having a larger data capacity than individual zones of the plurality of zones;
identify a block of the plurality of blocks with a high access count relative to other blocks, wherein the access count for the identified block indicates a number of times data in the identified block has been read or written; and
subdivide the identified block into zones of the plurality of zones to identify at least one zone of the identified zones with access counts greater than or equal to the threshold.

6. The DSD of claim 1, wherein the controller is further configured to periodically identify zones with access counts greater than or equal to the threshold after at least one of a predetermined amount of time and a predetermined number of reads or writes of data on the at least one media.

7. The DSD of claim 1, wherein the at least one media comprises at least one disk and the destination zone is located in an outer diameter portion of the at least one disk.

8. The DSD of claim 1, wherein the controller is further configured to adjust the threshold based on a data access time between zones with high access counts relative to other zones of the plurality of zones.

9. The DSD of claim 1, wherein the controller is further configured to relocate data from the at least one zone of the identified zones by at least:
copying the data from the at least one zone of the identified zones to a first staging area on the at least one media;
copying data from the at least one destination zone to a second staging area on the at least one media;
copying the data from the first staging area to the at least one destination zone; and
copying the data from the second staging area to the at least one zone of the identified zones.

10. The DSD of claim 1, wherein the at least one destination zone is located on a first disk surface of the at least one media so that the relocated data is radially in closer physical proximity to the other data from the at least one other identified zone on a second disk surface of the at least one media.

11. A method for managing data stored on at least one media of a Data Storage Device (DSD), the method comprising:
logically dividing at least a portion of the at least one media into a plurality of zones by dividing logical block addresses for the at least one media into ranges of logical block addresses;
identifying zones of the plurality of zones with access counts greater than or equal to a threshold, wherein the access count for each of the identified zones indicates a number of times data in the zone has been read or written; and
relocating data from at least one zone of the identified zones to at least one destination zone on the at least one media so that the relocated data is in closer physical proximity to other data from at least one other identified zone.

12. The method of claim 11, wherein the access count is a random access count indicating a number of times data in the zone has been non-sequentially read or written.

13. The method of claim 11, wherein the access count is a sequential access count indicating a number of times data in the zone has been sequentially read or written.

14. The method of claim 11, further comprising updating a mapping indicating physical locations for data stored on the at least one media by offsetting physical addresses in the mapping for the relocated data.

15. The method of claim 11, further comprising:
logically dividing the at least one media into a plurality of blocks with each block having a larger data capacity than individual zones of the plurality of zones;
identifying a block of the plurality of blocks with a high access count relative to other blocks, wherein the access count for the identified block indicates a number of times data in the identified block has been read or written; and
subdividing the identified block into zones of the plurality of zones to identify at least one zone of the identified zones with access counts greater than or equal to the threshold.

16. The method of claim 11, further comprising periodically identifying zones with access counts greater than or equal to the threshold after at least one of a predetermined amount of time and a predetermined number of reads or writes of data on the at least one media.

17. The method of claim 11, wherein the at least one media comprises at least one disk and the destination zone is located in an outer diameter portion of the at least one disk.

18. The method of claim 11, further comprising adjusting the threshold based on a data access time between zones with high access counts relative to other zones of the plurality of zones.

19. The method of claim 11, further comprising relocating data from the at least one zone of the identified zones by at least:
copying the data from the at least one zone of the identified zones to a first staging area on the at least one media;
copying data from the at least one destination zone to a second staging area on the at least one media;
copying the data from the first staging area to the at least one destination zone; and
copying the data from the second staging area to the at least one zone of the identified zones.

20. The method of claim 11, wherein the at least one destination zone is located on a first disk surface of the at least one media so that the relocated data is radially in closer physical proximity to the other data from the at least one other identified zone on a second disk surface of the at least one media.

21. A computer readable medium storing computer-executable instructions for managing data on at least one media of a Data Storage Device (DSD), wherein when the computer-executable instructions are executed by a controller or processor, the computer-executable instructions cause the controller or processor to:
divide the at least one media into a plurality of zones by dividing logical block addresses for the at least one media into ranges of logical block addresses;
identify zones of the plurality of zones with access counts greater than or equal to a threshold, wherein the access count for each of the identified zones indicates a number of times data in the zone has been read or written; and
relocate data from at least one zone of the identified zones to at least one destination zone on the at least one media so that the relocated data is in closer physical proximity to other data from at least one other identified zone.

22. The computer readable medium of claim 21, wherein the access count is a random access count indicating a number of times data in the zone has been non-sequentially read or written.

23. A Data Storage Device (DSD), comprising:
at least one media for storing data; and
a controller configured to:
- logically divide the at least one media into a plurality of blocks;
- identify at least one block of the plurality of blocks with a high access count relative to other blocks, wherein the access count for the at least one identified block indicates a number of times data in the at least one identified block has been read or written;
- subdivide the at least one identified block into a plurality of zones;
- identify zones of the plurality of zones with access counts greater than or equal to a threshold, wherein the access count for each of the identified zones indicates a number of times data in the zone has been read or written; and
- relocate data from at least one of the identified zones to at least one destination zone on the at least one media to reduce a data access time between the identified zones.

24. A method for managing data stored on at least one media of a Data Storage Device (DSD), the method comprising:
- logically dividing the at least one media into a plurality of blocks;
- identifying at least one block of the plurality of blocks with a high access count relative to other blocks, wherein the access count for the at least one identified block indicates a number of times data in the at least one identified block has been read or written;
- subdividing the at least one identified block into a plurality of zones;
- identifying zones of the plurality of zones with access counts greater than or equal to a threshold, wherein the access count for each of the identified zones indicates a number of times data in the zone has been read or written; and
- relocating data from at least one of the identified zones to at least one destination zone on the at least one media to reduce a data access time between the identified zones.

* * * * *